United States Patent
Washizuka

[11] 3,902,169
[45] Aug. 26, 1975

[54] DRIVE SYSTEM FOR LIQUID CRYSTAL DISPLAY UNITS

[75] Inventor: Isamu Washizuka, Kyoto, Japan

[73] Assignee: Sharp Kabushiki Kaisha, Osaka, Japan

[22] Filed: Sept. 19, 1973

[21] Appl. No.: 398,850

[30] Foreign Application Priority Data
Sept. 19, 1972 Japan .................. 47-95606
Apr. 3, 1973 Japan .................. 48-38474

[52] U.S. Cl. .............................................. 340/336
[51] Int. Cl. ....................... 350 160 LC; G08b 5/36
[58] Field of Search ............ 340/336; 350/160 LC

[56] References Cited
UNITED STATES PATENTS

| | | | |
|---|---|---|---|
| 3,653,745 | 4/1972 | Mao | 350/160 LC |
| 3,760,406 | 9/1973 | Walton | 340/336 |
| 3,781,864 | 12/1973 | Fujita | 350/160 LC |
| 3,789,388 | 1/1974 | Medwin | 340/336 |
| 3,809,458 | 5/1974 | Heuner et al. | 350/160 LC |

Primary Examiner—David L. Trafton
Attorney, Agent, or Firm—Stewart and Kolasch, Ltd.

[57] ABSTRACT

The present disclosure is directed toward a system for driving a plurality of liquid crystal display units each having a common electrode, a plurality of segment electrodes and a liquid crystal composition interposed between the said electrodes. The liquid crystal compositions are energized and activated upon the application of a voltage higher than a given threshold voltage between said electrodes which initiates scattering of light therein. When the liquid crystal display units are desired to be deenergized, a voltage lower than the threshold voltage is applied between said electrodes. In a dynamic mode of operation, as contrasted to ordinary dynamic drive systems, the less than threshold voltage is applied in an alternating fashion across the liquid crystal compositions desired not to be selected. Such application of alternating bias voltage to the liquid crystal composition in its non-selected state is to ensure a long life and a high speed of response and so on.

7 Claims, 5 Drawing Figures

| state of common electrode | state of segment electrode | potentials between both electrodes | state of display |
|---|---|---|---|
| selection $\mp 2V_{th}$ | selection $\pm V_{th}$ | $\mp 3V_{th}$ | turbulence |
| selection $\mp 2V_{th}$ | no-selection $\mp V_{th}$ | $\mp V_{th}$ | no-turbulence |
| no-selection $0V$ | selection $\pm V_{th}$ | $\mp V_{th}$ | no-turbulence |
| no-selection $0V$ | no-selection $\mp V_{th}$ | $\pm V_{th}$ | no-turbulence |

FIG. 5

DRIVE SYSTEM FOR LIQUID CRYSTAL DISPLAY UNITS

BACKGROUND OF THE INVENTION

This invention relates to a display device containing a nematic liquid crystal composition and more particularly to a drive system for applying alternating voltage to the liquid crystal composition to enable time-sharing display performances with advantages in speed of response, life and effect of light scattering thereof.

Liquid crystal display devices are generally composed of two electrodes at least one of which is transparent and further a liquid crystal composition interposed therebetween. The application of DC voltage, pulse voltage or AC voltage between both the electrodes results in scattering of light and, as a result, differences in brightness between the light scattering region and the non-light scattering region define a desired display pattern. Methods for displaying information, for example, such as numerals, symbols or characters with the use of the liquid crystal display units include one approach of driving them in a DC fashion (that is, static mode) and another approach of driving them in a time-sharing fashion (that is, dynamic mode). The system of this invention is concerned with the latter fashion.

In the display drive system in the dynamic mode, signals to be applied to individual electrodes of plural display units are divided into two kinds; numeral, symbol, character or the like signals sequentially led out, and time sharing signals synchronous with the lead out of the first named signals. The contents of the display are selected depending upon the logical products of the both signals. This system can provide reduction in the number of driver circuits and in the number of input lines for signal transmission and, in view of these advantages, be widely implemented in circuits within present day various apparatus.

In the application of such dynamic mode of the drive system to the liquid crystal displays, the liquid crystal devices have particular characteristics or shortcomings as follows in comparison with the conventional displays such as discharge type character indication tubes (trade mark NIXIE) and phosphoresence type tubes.

1. A speed of response is extremely low as compared with other displays.
2. The application of a voltage in an alternating polarity fashion is superior to that in an unchanged polarity fashion (viz. applications of DC voltage or DC pulse voltages) from the viewpoints of life.
3. The electrodes are not directional and the degree of light scattering is thus determined only by absolute values of applied voltages.
4. As understood from the relation between the applied voltage and the degree of light scattering, some of the liquid crystals have definite threshold values and others do not have such definite threshold values but vary suddenly in the degree of light scattering when a specified voltage level is exceeded. The threshold value may be varied by varying a pulse ratio (in other words, a ratio of the scattering period of time to the not-scattering period).

OBJECTS AND SUMMARY OF THE INVENTION

It is, therefore, an object of this invention to provide an effective liquid crystal display system taking account of the above discussed points as a whole.

The novel drive system in accordance with the invention has been developed by the following concepts or principles of operation.

First of all, the inventor has discovered the phenomenon that, in the effects of light scattering achieved in the liquid crystal compositions, a period of time where the transmission factor thereof varies transiently upon the application of the more than threshold voltage is influenced by the states of such compositions prior to such application. That is, the transient period in the case where a predetermined bias voltage less than the threshold voltage is applied across the liquid crystal composition prior to the application of the more than threshold voltage, becomes shorter as compared with that in the case where no voltage is applied previously to the same. For this reason it is advantageous that the voltage having this bias effect is applied to the liquid crystal compositions when to be not selected. In addition, in order to ensure long life, such bias voltage is applied in the polarity-alternating fashion rather than in the polarity-fixed fashion.

Second, by employing phase controls in applying signals thereto in the alternating fashion, the alternating voltage is substantially applied thereto not only for the non-selected period but also for the selected period so that the liquid crystal display units enjoy a long life irrespective of the pulse ratio. Implementations of the alternating voltage generator circuit may be simplified by employing the phase control technique.

Finally, more specifically in the selected states the alternating voltage of effective value is twice as high as the threshold value voltage and of time width of 4 – 40 ms and is applied to the common electrode during the time shared unit period and, in the non-selected states, the voltage applied thereto is at a center level of the alternating voltage waveform. On the other hand, the alternating pulse of effective value substantially equal to the threshold voltage level and of time width substantially equal to and synchronous with the foregoing alternating pulse to be applied to the common electrode, is supplied to the individual segment electrodes in a manner that the phases thereof are relatively controlled with respect to the counterparts to be applied to the common electrodes in accordance with these intelligence contents. The signals having at least one cycle within the information unit period are in phase with the representations of the intelligence signals. When the phases of the segment electrode signals are different from that of the common electrode signals by 180°, high amplitude signals sufficient to cause light scattering effects are applied between the common and the segment electrodes.

The above and other objects and novel features of the invention are set forth in the appended claims and the invention as to its organization and its mode of operation will best be understood from a consideration of the following detailed description of the preferred embodiments.

DESCRIPTION OF THE PREFERRED EMBODIMENTS

Figure 1:
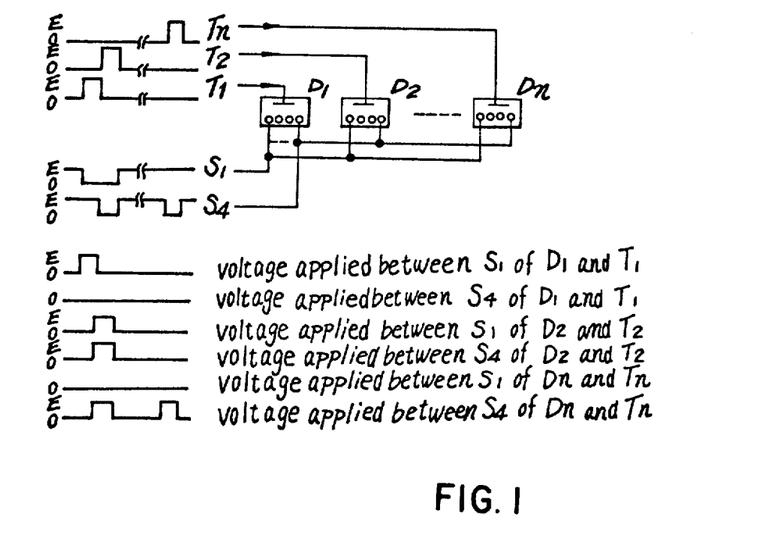
FIG. 1 is a simplified block diagram of a conventional time sharing drive system.

For comparison with the invention system, the prior art dynamic mode drive system is illustrated in FIG. 1 wherein numeral, symbol, character or the like signals $S_1 - S_4$ sequentially led out are applied to individual segment electrodes of plural display units $D_1 - D_n$ whereas time sharing signals $T_1 - T_n$ synchronous with the first named signals $S_1 - S_4$ are applied to the common electrodes. The contents of the display are dependant upon the logical products of the both signals. Differences between the conventional system and the invention system will be more fully described hereinafter.

Figure 2:
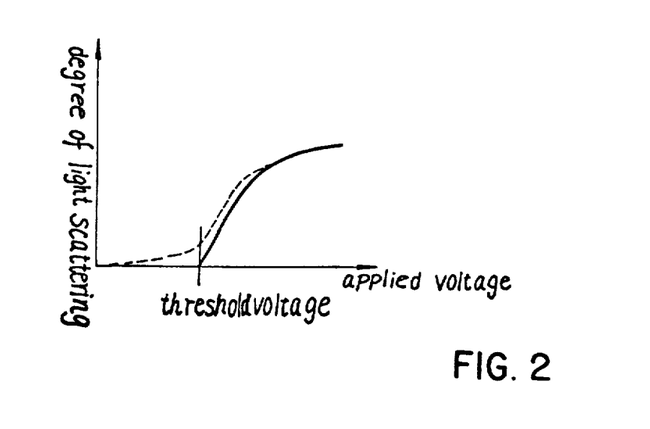
FIG. 2 is a graphic representation of liquid crystal characteristics.

FIG. 2 illustrates the degree of light scattering occurred in the liquid crystal composition versus voltage across the same. The solid curve represents a definite threshold Vth and the dotted curve an indefinite threshold Vth. Upon the threshold level voltage Vth the liquid crystal composition initiates light scattering due to turbulence.

Figure 3:
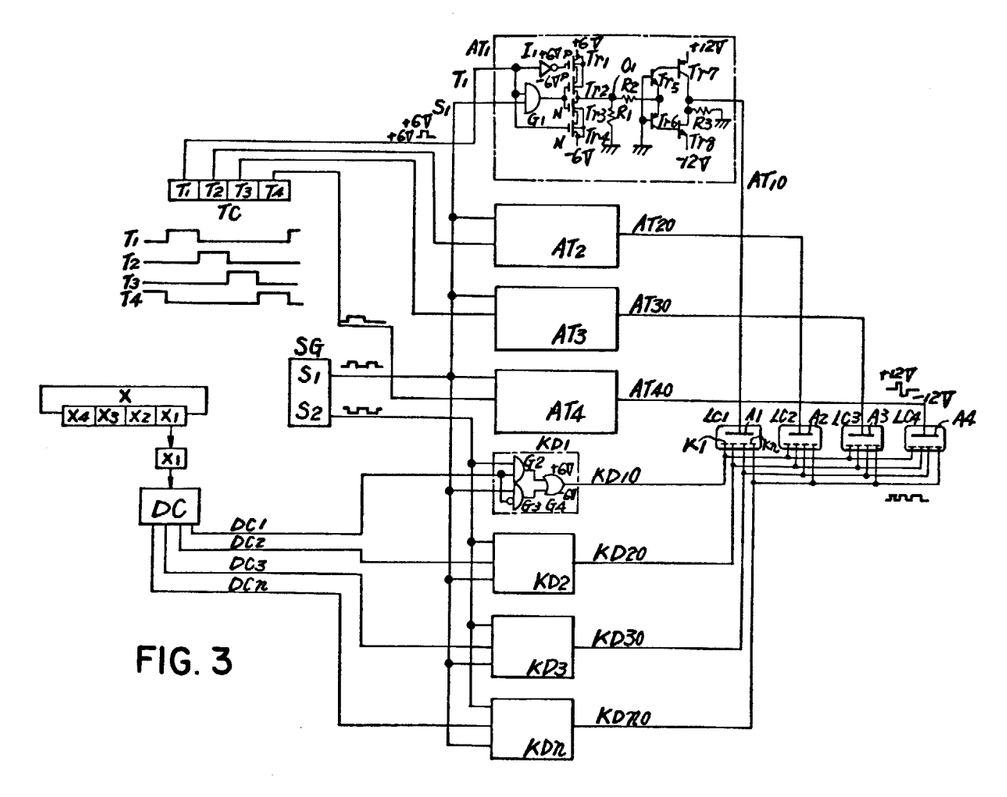
FIG. 3 is a block diagram of a drive system in accordance with the invention.

In FIG. 3, there is illustrated an embodiment of the invention as applied to a four-digit display. Each of the liquid crystal display units $LC_1 - LC_4$ contains a common electrode Al - A4 and a plurality of segment electrodes $K_1 - K_n$ of which the combinations define numeral patterns 0 - 9. A shift register X of four-digit capacity stores coded information to be displayed and circulates the contents thereof during display cycles. The information is derived from the least significant digit position $X_1$ thereof and introduced into a storage buffer $X_1$ for one digit time and furthermore converted into signals corresponding to segment alignment of the display units via a decoder DC.

Meanwhile, a time sharing signal (timing signal) generator circuit TC provides sequentially four timing signals $T_1 - T_4$ and the first or least significant digit information in the register X is led out via the buffer $X_1$ in synchronization with the timing signal $T_1$, the second digit information at the signal $T_2$, the third digit information at the signal $T_3$ and the fourth digit information at the signal $T_4$, respectively.

Signals associated with the timing signals are supplied to the common electrodes A1 - A4 whereas signals associated with the intelligence signals are supplied to the individual segment signals. The numerical intelligence signals when the timing signals are supplied are displayed as combinations of the segments.

The foregoing arrangement is essentially the same as well known dynamic mode display drive systems. In the application of the liquid crystal cells to display purposes the above discussed points should be taken account of. In accordance with the invention, as contrasted to ordinary drive art illustrated in FIG. 1, both the timing signals T1 - T4 and the segment decoder outputs $DC_1 - DC_4$ are first introduced to signal converter circuits $AT_1 - AT_4$ and $KD_1 - KD_n$ to convert them into signals appropriate to liquid crystal drive without directly applying them to the display units, and thereafter these converted signals $AT_{10} - AT_{40}$ and $KD_{10} - KD_{no}$ are supplied to the individual electrodes within the liquid crystal display units. These signal conversions are accomplished by producing conversion signals S1, S2 from the conversion signal generator circuit SG.

Figure 4:
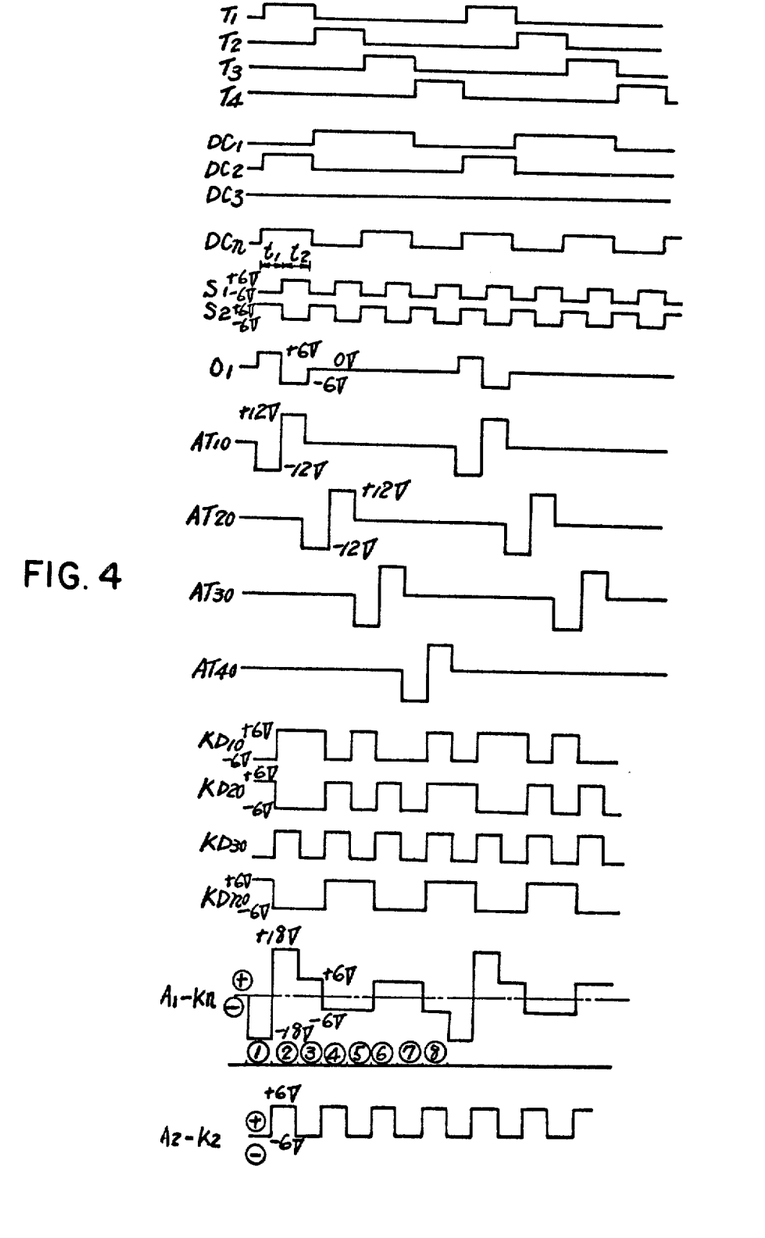
FIG. 4 is a time chart showing the relation of various pulses which occur in the system illustrated in FIG. 3.

With respect to FIG. 4 there is shown the timing signals T1 - T4, the segment decoder output signals DC1 - DC4, the conversion signals S1, S2 and the signal converter circuit outputs $AT_{10} - AT_{40}$, $KD_{10}-KD_{no}$ together with the states of the voltages applied in practice between the electrodes of the liquid crystal units.

The modes of operation of the drive circuit system illustrated in FIG. 3 will now be described with further reference to FIG. 4. The timing signals T1 - T4 supplied to the common electrodes are ones for digit selection and each timing signal, in this example, has one digit time width for the four digit time periods. The pulse ratio is 1 : 3. The signal converter circuits $AT_1 - AT_4$ serve to convert the timing signals into other signals in a manner to change the phase relation thereof relative to the segment signals to be described later.

In the practical example of the signal converter circuit $AT_1$, the finally resulting output $AT_{10}$ from an amplitude converter circuit is either +12V or −12V, within the selection periods of the timing signals, depending upon levels of the conversion signal and 0V within the non-selection periods.

Signals to the amplitude converter circuit are of two voltage levels +6V and −6V wherein these levels approximate the threshold value voltage of the liquid crystal compositions. Control circuits, for example, such as the timing circuit TC and peripheral circuits associated with the register X are operative upon supply of such power source voltage. +12V and −12V are so selected as to be twice as high as the threshold value voltage.

MOS type transistors $Tr_1 - Tr_4$ receive supply of the power source voltages +6V, −6V, the transistors $Tr_1$, Tr2 being of P type and the remaining transistors Tr3, Tr4 of N type. The source electrode of the transistor Tr1 is at −6V and the drain electrode thereof is connected to the source electrode of the second transistor Tr2. The terminal $O_1$ delivers the outputs thereof. The gate electrode of the transistor $Tr_1$ is connected with inversion signal-$T_1$ from an inverter $I_1$. The gate electrode of the transistor $Tr_2$ is coupled with the gate transistor of the third electrode $Tr_3$ and output of a gate circuit $G_1$ and the drain electrode of which is connected to the equivalence of the transistor $Tr_3$. The source electrode of the transistor $Tr_3$ is connected to the drain electrode of the fourth transistor $Tr_4$ of which the source electrode is connected to −6V and the gate electrode is connected to the timing signal $T_1$. Since inputs to the AND gate $G_1$ are the timing signal $T_1$ and the conversion signal $S_1$, the gate $G_1$ provides the outputs equal to the conversion signal $S_1$ during the selection period of the timing signal T1.

Considering states of the output $O_1$ in response to the inputs $T_1$ and $S_1$, the gate of the transistor $Tr_4$ is at −6V and the gate of the transistor $Tr_1$ is at +6V through the inverter $I_1$ and a couple of the transistors $Tr_4$, $Tr_1$ are in the OFF states during the non-selection period of the timing signal. Another couple of the transistors $Tr_2$, $Tr_3$ are connected in series to the transistors $Tr_1$, $Tr_4$ and, as a consequence, are not in the OFF states without regard to the states of the gate inputs. The output O1 is, therefore, held at the zero potential via a load resistor R1.

Alternatively, when the timing signal becomes the selection state hence +6V and −6V appear at the gate electrodes of the transistors $Tr_4$, $Tr_1$ respectively and then the transistors $Tr_1$, $Tr_4$ together are turned to the ON states. Viewing the inputs to the gate $G_1$ during the period $t_1$ as shown in FIG. 4, the timing signal $T_1$ is +6V and the conversion signal $S_1$ is −6V and thus the gate G1 is in the OFF state and the output thereof is −6V. Upon the appearance of −6V at the gate output, the transistor $Tr_3$ is held at the same potential as the substrate and thus in the OFF state, while the transistor Tr2 is held at the potential higher than the substrate potential, namely, +12V which is above the threshold value to render the transistor Tr2 to be the ON state. The transistor Tr1 also is in the ON state as previously described with the result in the output $O_1$ being +6V.

During the period of the time $t_2$, both the inputs to the gate $G_1$ are +6V and the gate output becomes +6V. At this time, although the gate of the transistor $Tr_2$ is held at the same potential as the substrate, the voltage of +12V is applied to the transistor $Tr_3$ with reference to the substrate, which voltage turns the transistor $Tr_3$ ON. Then, the output $O_1$ is −6V.

Two value signals are converted into three value signals in this manner. However, as noted earlier, the signals of the levels +12V, −12V should be applied to the common electrodes and such amplitude conversion is achieved by employing bipolar type transistors $Tr_5$ − $Tr_8$.

The PNP transistor $Tr_7$ and the NPN transistor $Tr_8$ are coupled in a complementary fashion wherein the collectors of the transistors $Tr_7$, $Tr_8$ together are connected and the emitters thereof are connected to +12V and −12V respectively. The base of the transistor $Tr_7$ is connected to the collector of the NPN transistor $Tr_5$ while the base of the transistor Tr8 is connected to the collector of the PNP transistor Tr6.

The bases of the transistors Tr5, Tr6 are commonly connected to 0V which is the intermediate level between the input levels. The emitters of the transistor Tr5, Tr6 also are commonly connected to the output point $O_1$.

This type of the conversion circuit is suitable for circuit integration and is capable of easily adjusting a drive current for the IC on the exterior thereof where the amplitude of outputs are desired to vary depending upon modifications of the kinds of the liquid crystal compositions or the pulse ratios of voltage to be applied to the liquid crystal compositions.

Auxiliary transistors $Tr_5$, $Tr_6$ which control the base currents of the control transistors Tr7, Tr8, are the emitter follower type having a common resistor R2 as emitter load and the bases thereof are held at a fixed power voltage 0V. Therefore, if the power voltages +6V, −6V to the input circuits are constant, the emitter currents through the transistors Tr5, Tr6 will become constant. It gives satisfactory results that the base current through the transistors tr7, Tr8 become constant and as a result the current value to the load or the liquid crystal units may be quite freely selected by means of the resistor R2. Hence, where the amplitude conversion circuit is incorporated within the IC or module circuit, the advantages of the present example include improvements in the circuit integration density and minimizations of the temperature rise.

The detailed description will be directed to the relation between inputs and outputs of the amplitude conversion circuit. When the potential at the output point $O_1$ is +6V, the base-emitter path of the transistor Tr6 is biased forward to allow current flow through the collector thereof so that the transistor Tr8 is changed to the ON state and the collector potential thereof approximates the emitter potential, −12V. Nevertheless, the other transistor Tr7 remains the OFF state because of the transistor Tr5 connected to the base of the transistor Tr5 being biased backward.

Conversely, when the potential at the output point $O_1$ is −6V, forward bias is impressed on the transistor Tr5 causing the transistor Tr7 to be in the ON state and the collector potential thereof to be substantially equal to the emitter level or +12V. Afterward, when the output point $O_1$ is at 0V, no bias voltage is applied to both the transistors Tr5, Tr6, which then remain in the OFF states. It follows that the transistors Tr7, Tr8 remain in the OFF states concurrently and the potential, 0V is applied via a load resistor R3 to the collector coupling points $AT_{10}$ associated with the transistors Tr7, Tr8.

In this way, by utilizing the above described amplitude conversion circuit, such modified signals $AT_{10}$ − $AT_{40}$ as illustrated in FIG. 4 are supplied to the common electrodes of the individual liquid crystal display units. Though the amplitude of alternating outputs at the input circuit side is about the threshold value (6V), the output derived during the digit selection period has the effective value twice as high as the threshold value.

As regards the signals to the segment electrodes, the segment decoder outputs $DC_1$ − $DCn$ are introduced as inputs into the conversion circuits $KD_1$ − $KDn$ for the purpose of phase-controlled conversion.

The segment signal conversion circuit is comprised of two AND gates G2, G3 operative at +6V, −6V and an OR gate G4. The gate circuit G2 has the function of processing during the segment selection and receives the pre-modified segment signals together with the conversion signal S2 the phase of which differs by 180° from the conversion signal $S_1$ employed for the common electrode signal of the conversion circuit previously disclosed in detail. On the other hand, the gate circuit G3 is operative during the segment non-selection period and is responsive to two inputs thereto, the inverted segment signal and the conversion signal S1.

By applying these outputs from the AND gates G2, G3 to the OR gate G4, which provides signals S2 being +6V at the time t1 and −6V at the time t2 during the selection period and signals S1 being −6V at the time t1 and +6V at the time t2.

The outputs $KD10$ − $KD_{no}$ from the segment signal conversion circuits KD1 − KDn for examples of the decoder outputs $DC_1$ − $DC_n$ are illustrated in FIG. 4. For the sake of convenience, the relation of applied voltage to the liquid crystal units will be described in conjunction with particular segment electrodes, for example, the segment $K_n$ of the liquid crystal display unit $LC_1$ and the segment $K_2$ of the display unit LC2.

The first is for the segment Kn of the unit LC1. The common electrode A thereof is selected at the time ① ②and is held at −12V at the time①and at +12V at the time②. Simultaneously, the segment Kn also is selected and is held at +6V at the time①and at −6V at the time ②. Therefore, at the time①the common electrode $A_1$ is negative with respect to the segment electrode Kn and the potential therebetween is at 18V and, conversely, at the time②the former is positive with respect to the latter with the potential 18V therebetween. When the common electrode and the segment electrode together are selected, the difference in phase between $AT_{10}$ and $KD_{10}$ is 180° and the potential therebetween is three times higher than the threshold value voltage with alternating the polarity thereof for every 90° phase. In summary, the potential of 18V appears between the both electroded during the selected states but the polarity thereof is inverted from the time①to the time②. It signifies the application of alternating voltage. In response to the alternating voltage about three times as high as the threshold value, the liquid crystal composition exhibits the light scattering effects.

During the period③,④, the common electrode $A_1$ is not selected and is held at 0V. On the other hand, the segment electrode $K_n$ is not selected and is held at −6V at the time③and +6V at the time④. Therefore, the common electrode potential is positive 6V with respect to the segment electrode potential at the time③ and negative 6V at the time④. Under these conditions, the alternating voltage of 6V is applied between $A_1 - K_n$ and the liquid crystal composition filled therebetween does not exhibit effects of light scattering.

As previously described, the threshold value voltage of the liquid crystal composition is referred to as the voltage effective to cause sharp variations in the light scattering effects. In providing digital representation depending on the degree of scattering, it has been experimentally confirmed that the representation upon the application of the more than doubled threshold value is fully distinguishable from that provided by the application of the less than threshold value.

During the period of time⑤,⑥, the common electrode $A_1$ is continuously in the non-selection state and held at 0V while the segment electrode $K_n$ is in the selection state and held at −6V at the time⑤and +6V at the time⑥, with the results that the alternating voltage of 6V is supplied to the liquid crystal composition. The unit allows no effects of light scattering, therefore, during this time period. It should be noted that the liquid crystal composition is biased by the application of the alternating voltage less than the threshold value even when the same are not desired to ignite.

The states at the time⑦,⑧are the same as that at the time③,④.

It will be appreciated from the foregoing description that, in the above example, the substantial light scattering phenomenon occurs between $A_1 - K_1$ only at the points in time①,②when the common electrode and the segment electrode are both selected. Since the illustrated system is of dynamic mode, these conditions are repeated so that the turbulence voltage is repeatedly applied thereto to cause the effects of light scattering on the segment $K_n$ every point in the time①,②, namely, every arrival of the timing signal $T_1$.

The following is for the segment $K_2$ of the liquid crystal display unit $LC_2$. During the period①,②the common electrode $A_2$ and the segment electrode $K_2$ are respectively in the non-selection state and the selection state. $K_2$ is held at +6V at①and −6V at②. As a result, the potential at the former electrode is negative by 6V with reference to the latter electrode at the point①and positive by 6V at the point②. The light scattering effects, therefore, are not allowed at this time.

Next, during the period③,④where the common electrode $A_2$ is selected and the segment electrode $K_2$ is not selected, $A_2$ is held at −12V for the half cycle③and +12V for the opposite half cycle④whereas $K_2$ is at −6V at the point③and +6V at the point④. The common electrode potential becomes negative 6V with reference to the segment potential at the point③and positive 6V at the point④. The liquid crystal composition is still in the non-turbulence state. During the period⑤−⑧the common electrode remains the non-selected state and the liquid crystal composition is biased by the alternating voltage of 6V and, of courece, does not exhibit the effects of light scattering.

Figure 5:
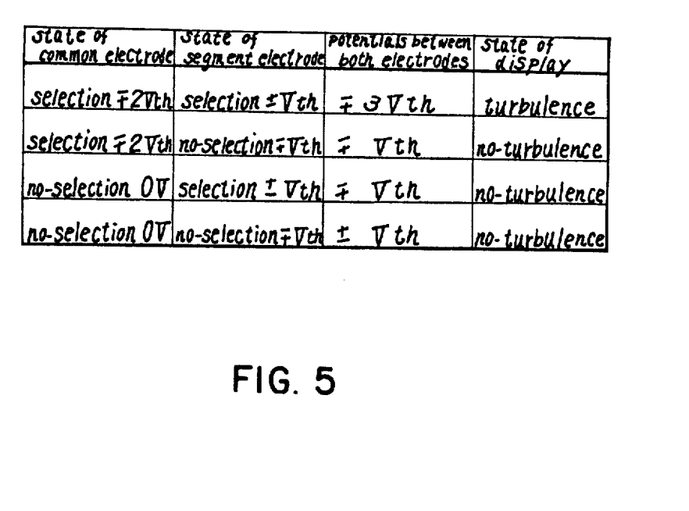
FIG. 5 is a graphic representation for the purpose of explanation of operations in the system in FIG. 3.

The levels of signals for the common electrodes and the segment electrodes and the turbulence states in the two explanatory examples will be viewed from FIG. 5. It will be seen from this drawing that the alternating voltage is more or less supplied between the common electrode and the segment electrode without regard to the selected state or the non-selected state. It provides satisfactory results in life of the liquid crystal units.

For example, in the other drive system departing from the system of the invention wherein the amplitude of signals to be applied to the common electrode is made equal to that for the segment electrode, e.g. ±6V in accordance with the ordinal prior art concept, although the design of power supply circuit is simplified as compared with the system of the invention, no potential difference appears between both electrodes even where the common electrode and the segment electrode are selected simultaneously.

In addition, the time required to change the state of the liquid crystal device to the turbulence state upon the application of voltage sufficient to cause the turbulence effects is shortened, since the bias voltage is always applied to the liquid crystal composition even for the non-turbulence state (during the non-selected state).

The following additional effects have been found in the inventor's experiments. In other words, the invention includes the concept that the alternate bias voltage applied to the liquid crystal composition which is not desired to exhibit the effects of light scattering is applicable to the scattering controlling purposes.

The liquid crystal has, in essence, considerably slow response from the non-turbulence state to the turbulence state and advances to the turbulence state by degrees upon the receipt of integration of supply of successive pulses. Therefore, the more the pulse ratio increases, the more the threshold level effectively raises. Nevertheless, in practice, the threshold value in the case of time sharing drive mode with the pulse rate, for example, 1:3 may be selected to equal the threshold value in the case of the pulse ratio 1:1, because the bias voltage is normally supplied across the liquid crystal even where the common electrode is not selected. In these circumstances, the threshold value in applying the selection signal for the turbulence selected at the pulse ratio 1:3, becomes higher than that determined at the pulse ratio 1:1, namely, Vth+ΔV.

This signifies that, though the amplitude of the selection signal to the common electrode is selected at 2Vth (twice the threshold voltage) in the foregoing example, the application of voltage of 2Vth+ΔV substantially produces only the potential difference of (2Vth+ΔV) −Vth = Vth+ΔV where the common electrode is in the selected state and the segment electrode is in the non-selected state, such that the liquid crystal unit still remains in the desired non-turbulence state. After that, where the common electrode and the segment electrode are both selected, the potential of 3Vth+ΔV appears therebetween to make rapid progress of the turbulence phenomenon in liquid crystal molecules and thus of light scattering.

In the inventor's experiments upon the liquid crystal unit having the threshold voltage of about 6V at the pulse ratio 1:1, it has been confirmed that when operating at the pulse ratio 1:3 and at the cycle of 40 msec. the threshold voltage thereof increases to about 8V.

In the example illustrated in FIG. 4, where the amplitude of the segment potential is ±6V, the amplitude in selecting the common electrode may increase from ±12V to ±14V. When the common electrode is selected and the segment electrode is not selected, the potential of ±8V appears therebetween and will not cause the liquid crystal unit to be in the turbulence state. When the both electrodes are selected, the potential of ±20V is applied therebetwwen to cause the effects of light scattering.

Although in the above example the voltage is applied in an alternate fashion not only for the selection period but also for the non-selection period, the voltage may be applied only for the non-selection period to ensure merely the bias effects.

Various other modifications of the disclosed embodiments, as well as other embodiments of the invention, may become apparent to persons skilled in the art without departing from the spirit and scope of the invention as defined by the appended claims.

I claim :

1. A drive system for driving a liquid crystal unit having a given threshold voltage value which initiates a change in the optical characteristics of said liquid crystal unit, said drive system comprising
means for applying an alternating polarity voltage lower than the threshold value to the liquid crystal unit when it is not desired to be ON.

2. A drive system as defined in claim 1 wherein the voltage to the liquid crystal unit to be selected is chosen to be more than twice as high as the threshold value.

3. A liquid crystal display system comprising
a plurality of liquid crystal display units, each unit having a common electrode, a plurality of segment electrodes the combinations of which define displaying patterns, as well as a liquid crystal composition between said common and said segment electrodes having a given threshold voltage value which initiates a change in the optional characteristics of said liquid crystal unit,
connection means for commonly connecting the corresponding segment electrodes in the individual display units.
first selection means for repeatedly applying segment selection signals to the individual groups of the commonly connected segment electrodes,
second selection means for applying timing signals to the common electrodes to enable time sharing selections of the plural display units, and
amplitude determination means for so determining the relation between the applied segment selection signals and the timing signals that a voltage higher than the threshold value is applied in alternating polarities between the common electrode and selected segment electrodes when said liquid crystal is to be activated and the less than threshold value voltage is applied in alternating polarities between said common and said segment electrodes when said liquid crystal is to be non-activated.

4. A liquid crystal display system for displaying information stored in a storage register by means of a plurality of liquid crystal display units each unit having a common electrode, a plurality of segment electrodes defining representation of the information to be displayed, and a liquid crystal composition filled between the common electrode and the segment electrodes, said display system comprising
timing signal generator means for generating a train of sequentially phase-shifted signals,
timing signal conversion means for modifying the individual timing signals into signal waveforms of alternating polarity within each period of the timing signals,
timing selecting means for applying the alternating polarity voltage timing signals to the common electrodes of the individual display unit to enable time sharing selection for the display units,
decoder means for decoding the information stored in the storage register and translating the decoded information into segment selection signals for the segment type liquid crystal display units,
segment selection signal conversion means for modifying the individual segment selection signals into signal waveforms of alternating polarity within each period of the timing signals, and
segment selection means for applying the alternating polarity voltage segment signals to individual segment electrodes in phase opposition to said alternating polarity voltage timing signals applied to said common electrodes.

5. In a system for driving a liquid crystal unit comprising a pair of electrodes and a liquid crystal composition held between the pair of the electrodes, said unit having a threshold voltage value at which it will turn on and below which it will turn off and exhibiting a delayed response to a voltage across said electrodes in excess of said threshold value, the improvement comprising:
circuit means for producing a bipolar alternating bias voltage having a positive polarity component and a negative polarity component with reference to zero potential, both of said components having an amplitude greater than zero potential but less than the value of said threshold voltage and insufficient to turn on the liquid crystal unit; and connection means interposed between said circuit means and said liquid crystal unit for applying said bias voltage and hence said positive and negative polarity components across said electrodes of said liquid crystal unit when it is not desired to be on to substantially reduce the response delay of said liquid crystal unit to voltages across said electrodes in excess of said threshold voltage.

6. A system for driving a liquid crystal unit comprising a pair of electrodes and a liquid crystal composition held between said pair of electrodes, said unit having a threshold voltage vale at which it will turn on and below which it will turn off and exhibiting a delayed response to a voltage across said electrodes in excess of said threshold value, said system comprising:
circuit means for producing bipolar alternating turn-on and turn-off voltages having a positive polarity component and a negative polarity component with reference to zero potential, said positive and negative components of said turn-on voltage having an amplitude sufficient to turn-on said liquid crystal unit, said positive and negative components of said turn-off voltage having an amplitude which is intermediate said turn-on voltage level and zero potential and hence insufficient to turn on the liquid crystal unit; and connection means interposed between said circuit means and said liquid crystal unit for applying said positive and negative polarity components of said turn-on voltage across said liquid crystal unit when it is desired to be on and for applying said positive and negative polarity components of said turn-off voltage across said liquid crystal unit when it is desired to be off to increase the useful life of said liquid crystal unit and to substantially reduce the response delay of said liquid crystal unit to voltages across said electrodes in excess of said threshold voltage.

7. A system for driving cycle-by-cycle a liquid crystal unit comprising a pair of electrodes and a liquid crystal composition held between the pair of the electrodes, said unit having a threshold voltage value at which it will turn on and below which it will turn off and exhibiting a delayed response to a voltage across said electrodes in excess of said threshold value, said system comprising circuit means for producing bipolar alternating turn-on and turn-off voltages having a positive polarity component and a negative polarity component with reference to zero potential within the same cycle, said positive and negative components of said turn-on voltage having an amplitude sufficient to turn-on said liquid crystal unit, said positive and negative components of said turn-off voltage having an amplitude which is intermediate said turn-on voltage level and zero potential and hence insufficient to turn on the liquid crystal unit; and connection means interposed between said circuit means and said liquid crystal unit for applying said positive and negative polarity components of said turn-on voltage across said liquid crystal unit when it is desired to be on and for applying said positive and negative polarity components of said turn-off voltage across said liquid crystal unit when it is desired to be off to increase the useful life of said liquid crystal unit and to substantially reduce the response delay of said liquid crystal unit to voltages across said electrodes in excess of said threshold voltage.

* * * * *